United States Patent Office 3,338,985
Patented Aug. 29, 1967

3,338,985
GRAFT COPOLYMERS OF EPOXYETHYLENE GROUPS OF POLYAMIDE OR POLYESTER SUBSTRATES
Eugene Edward Magat, Spring Valley, Wilmington, Del., and David Tanner, Charlottesville, Va., assignors to E. I. du Pont de Nemours and Company, Wilmington, Del., a corporation of Delaware
No Drawing. Filed Nov. 14, 1966, Ser. No. 593,660
9 Claims. (Cl. 260—830)

This application is a continuation-in-part of application Ser. No. 578,414, filed Sept. 9, 1966, which is a continuation of application Ser. No. 863,047, filed Dec. 30, 1959 (now abandoned), which is a division of application Ser. No. 735,288, filed May 14, 1958, now U.S. Patent 3,188,228, which is a continuation-in-part of our abandoned application Ser. No. 499,754, filed Apr. 6, 1955, and Ser. No. 503,790, filed Apr. 25, 1955.

Introduction

This invention is concerned with fibers from grafted synthetic polymeric esters and amides.

State of the art

Grafted copolymers have been developed for many end-uses. Grafted synthetic linear condensation polymers have been studied less extensively than the addition polymers, since the latter are especially adapted to grafting reactions requiring free radical activity, which may be present as a result of the polymerization process, or may be induced by activating residual unsaturated (double) bonds.

By means of these grafts, properties not normally found in condensation polymers may be provided. For example, increased reactivity, improved static resistance, resistance to hole melting and the like can be attained without significant loss in the properties of the substrate polymer.

Poor adhesion is a deficiency which is common to many of the synthetic condensation polymers. This deficiency is observed in peeling of coatings applied thereto, tire tread separation at the fiber-elastomer interface, separation of synthetic fiber-polyester resin laminates, and lower level of physical properties of fiber-reinforced plastics than would be predicted from their individual properties.

Object

It is an object of the present invention to provide a graft copolymer of a polyamide or polyester substrate which has improved adhesion as compared to unmodified polymer. The reactive groups grafted in accordance with this invention are cross-linkable so that fabrics made therefrom may have improved crease resistance.

The invention

These and other objects are attained in a graft copolymer comprising (a) a synthetic linear condensation polymer from the class consisting of polyamide and polyester, bearing (b) grafted side chains chemically bonded to the trunk of the said condensation polymer by carbon to carbon bonds, the said side chains bearing a substantial proportion of epoxyethylene radicals.

The polyamide which serves as a substrate for grafting is a fiber forming polyamide wherein the amide linkage is an integral part of the polyamide chain. Similarly, the polyesters are those wherein the ester linkage is an integral part of the polymer chain. The grafted chains are bonded by carbon-carbon linkages to the substrate polymer backbone.

The product is produced by grafting to the polymer substrate a compound which contains at least one epoxyethylene radical and at least one polymerizable aliphatically unsaturated double bond. Glycidyl methacrylate is the preferred modifier for producing the product. However, other modifiers which may be used are glycidyl acrylate, vinyl glycidyl ether, and 3,4 epoxybutene-1.

Grafting is most conveniently initiated by high energy radiation, such as high energy electrons, X- or gamma-rays. The polymer substrate may be soaked in the modifier either as a liquid or as a solution and the combination irradiated in a single step operation. Alternatively, the polymer substrate may be irradiated at room temperature and then, preferably, substantially immediately, contacted with the modifier in a two-step process. A preferred embodiment of the two step process is to irradiate the polymer below 10° C., preferably below 0° C. and then contact it with the modifier. Grafting occurs as the combination is warmed.

The polymer substrate may be grafted in the form of fiber, film or other fabricated article by presoaking it in the solution so that sufficient modifier is absorbed. The combination is then irradiated to induce grafting, after which unbonded homopolymer and excess modifier is removed by washing. Alternatively, fiber or film may be treated after it has been fabricated into its final form. It will generally be sufficient to bond the modifier to the substrate as a surface coating, little penetration being required unless the object is to cross-link the substrate. In this event, complete penetration of the modifier throughout the substrate is preferred.

The invention is illustrated by the following examples but it is not limited thereby. Unless otherwise indicated, weight percentages are intended. Irradiation does are given in mrad where 1 mrad is equal to 1,000,000 rad.

EXAMPLE 1

Two swatches of 66 nylon (polyhexamethylene adipamide) fabric are soaked in treating solution as indicated in Table 1. After the soaking period, they are wrapped (while still wet) in polyethylene film, and are subjected to electron irradiation, using a 2 mev. Van de Graaff electron accelerator as a source of radiation. The beam-out current is 250 microamperes, which gives a dose of 1 mrad per pass as the sample is conveyed under the beam. A total dose of 7 mrad is employed. Following the irradiation, they are treated in a Soxhlet extractor for 24 hours with the solvent listed.

TABLE 1

| Sample No. | Treating Solution | Soak Time, hr. | Soak Temp., ° C. | Dose, Mrad | Extraction Solvent |
|---|---|---|---|---|---|
| A | 80% glycidyl methacrylate in methanol. | 24 | 25 | 7 | Methyl-ethyl ketone. |
| B | 10 parts glycidyl methacrylate plus 40 parts methyl acrylate. | 5 | 25 | 7 | Do. |

Vulcanized test samples are prepared by placing strips of fabric, 1" x 5¾" on uncured 5¾" x 6" slabs of natural rubber. The composite slab is cured in a mold for 45 min. at 141° C., under a mold pressure of 114.9 lbs./in.².

Adhesion is tested by peeling the fabric back 1" from the rubber, then fabric and rubber base are clamped in an Instron tester, and the force required to strip the fabric from the cured rubber is measured in pounds per inch. The results of the test are given in Table 2, along with similar results for an ungrafted nylon control, C.

TABLE 2

| Sample No. | Modifier | Percent Grafted | Tear Adhesion lbs./in. |
|---|---|---|---|
| A | Glycidyl methacrylate | 15.9 | 5.2 |
| B | Glycidyl methacrylate plus methyl acrylate | 64.5 | 6.0 |
| C | None (control) | | 2.8 |

Additional swatches of B and C are vulcanized to GR–S rubber. The adhesion of B is 40 lbs./in. vs. 6.8 for Control C.

EXAMPLE 2

Nylon fabric sample A is soaked for 24 hours at room temperature in a solution of 40% glycidyl methacrylate in methanol. After soaking, the fabric is squeezed between layers of filter paper and passed through a clothes wringer, then wrapped in aluminum foil. The sample is irradiated at room temperature under the beam of the 2 mev. Van de Graaff electron generator for a total dosage of 5 mrad. After exposure, the non-grafted material is removed by a 24 hour Soxhlet extraction with methylethylketone. After drying over $P_2O_5$, a weight gain of 4.0% is observed.

The test is repeated, using nylon fabric samples B, C, D, and E. The treating solutions are mixtures of glycidyl methacrylate (GMA) methanol and water, as indicated in Table 3. The soaking time is indicated in the table. These samples are irradaited in individual polyethylene bags containing 50 ml. of the treating solution. Following irradiation at the dose indicated in the table, they are subjected to the same extraction treatment as sample A. After extraction, the weight gains are determined (Table 3). Fabrics B, C, and D are white and have a soft and silk-like hand. Fabric sample E is stiffer than unmodified nylon, has a pleasant dry hand, and shows improved adhesion to rubber when tested according to the procedure of Example 1.

TABLE 3

| Sample Number | Treating Solu. (percent by wt.) | Treating Time, hr. | Dose, Mrad | Wt. Gain, percent |
|---|---|---|---|---|
| A | 40% GMA, 60% $CH_3OH$ | 24 | 5 | 4.0 |
| B | 10% GMA, 45% $CH_3OH$, 45% $H_2O$ | 48 | 1 | 12.6 |
| C | 10% GMA, 45% $CH_3OH$, 45% $H_2O$ | 48 | 2 | 17.3 |
| D | 10% GMA, 45% $CH_3OH$, 45% $H_2O$ | 48 | 3 | 24.5 |
| E | 20% GMA, 40% $CH_3OH$, 40% $H_2O$ | 24 | 2 | 51.4 |

EXAMPLE 3

A switch of needled nylon batting (3–5 oz./yd.$^2$, 3″ staple) is soaked 15 hrs. at 25° C. in a solution containing 10 ml. glycidyl methacrylate, 45 ml. methanol and 45 ml. water. Following the procedure of Example 1, the wet batt is irradiated with 2 mev. electrons to a dose of 3 mrad. After removing non-grafted material, a weight gain of 46.5% is observed. A polyester resin laminate is prepared from the grafted batt. It is found to have a tensile yield strength of 5900 lbs./in.$^2$, compared to 2500 lbs./in.$^2$ for a similar laminate made from an ungrafted nylon batt.

EXAMPLE 4

A one-mil film of biaxially oriented polyethylene terephthalate is wet with monomeric glycidyl methacrylate wrapped in two-mil aluminum foil and irradiated with 2 mev. electrons to a dosage of 5 mrad. The film is then heated for one hour at 100° C. and finally extracted to constant weight with acetone at room temperature. A weight gain of 2.2% is obtained. The film is unchanged in appearance. It is highly adherent to polymeric epoxide adhesives and adhesion is not lost upon immersion in water.

Useful modifiers

The modifiers useful in producing the grafted product of this invention are unsaturated, polymerizable monomers containing epoxyethylene radicals. Suitable monomers are glycidyl methacrylate, glycidyl acrylate, vinyl glycidyl ether, butadiene monoxide and the like. Allyl glycidyl ether may be employed, but due to its low reactivity, requires a large radiation dose. In general, from 1 to about 100% weight gain will be sufficient to improve adhesion; 2 to about 50% is preferred.

It is within the scope of this invention to employ multifunctional unsaturated modifiers to produce some additional effect such as improved crease recovery, flame resistance, improved hand, and the like, as long as the grafted epoxy radicals are also present. It is preferred that no more than 49% of any other graft component be present.

Method of application

The substrate polymer may be contacted with the modifier composition before or after irradiation, as already stated. It may be applied as a solution or an emulsion. Since some penetrtaion of the composition into the polymer may be beneficial in improving bonding to an adhesive, choosing a solvent having a swelling effect on the substrate will increase the rate of diffusion. Pre-soaking in the modifier solution before irradiating will also enhance penetration. Alternatively, the polymer may be pre-swollen with swelling agent before contacting with the modifier composition. When contacting pre-irradiated substrate polymer, it is usually helpful to heat the modifier composition to accelerate the reaction. This is especially helpful with polyethylene terephthalate, which grafts best at temperatures above 80° C. In general, however, temperatures of 50 to 150° C. are satisfactory.

It will often be desirable to soak and/or irradiate filaments under sufficient tension to keep them from shrinking. This will help maintain maximum fiber orientation.

Irradiation conditions

By "ionizing radiation" is meant radiation having sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above is effective for the process of this invention, although energies of 50,000 ev. and over are preferred. Both particle radiation and ionizing electromagnetic radiation are included.

The preferred radiation for the practice of this invention is high energy ionizing particle radiation; for maximum utility, when using this type of radiation, energy equivalent to at least 0.1 million electron volts (mev.) is preferred. Higher energies are even more effective; there is no known upper limit, except that imposed by available equipment.

The high energy particle radiation is an emission of highly accelerated electrons or nuclear particles such as protons, neutrons, alpha particles, deuterons, beta particles, or the like, directed so that the said particle impinges upon the polymer.

Similarly, ionizing electromagnetic radiation (X-rays) useful in the process of this invention is produced when a metal target (e.g., gold or tungsten) is bombarded by electrons possessing appropriate energy, e.g., 0.1 mev. In addition to X-rays produced as indicated above, ionizing electromagnetic radiation suitable for carrying out the process of the invention may be obtained from a nuclear reactor ("pile") or from natural or artificial radioactive material, for example, cobalt 60.

The dose rate ("intensity" of dose) is not critical, being primarily a matter of available equipment. In general, high dose rates are preferred as promoting higher throughput.

Efficiency of dose utilization will usually be improved by keeping the fiber and excess monomer mixture in contact for an extended time after irradiation, with either the two-step of one step process. This will provide maximum opportunity for the radical-initiated chains to grow.

*Substrate shape*

The product of the instant invention may be grafted before or after converting to its final (i.e., filament) shape, if the modifier is sufficiently stable thermally to stand the temperatures required for melt spinning. When the fiber is grafted, it may be grafted before or after drawing. It may be grafted as yarn, staple, flock, tow or fabric of knitted, felted, or woven construction.

*Substrates*

Substrates useful for the graft copolymer of this invention are the synthetic linear fiber-forming polyamides and polyesters. The polyamides are characterized by recurring amido radicals as an integral part of the polymer chain. The amido radicals are linked by divalent organic radicals which may be aliphatic, cycloaliphatic or aromatic, or mixtures of the above. Typical polyamides are poly(hexamethylene adipamide), polycaprolactam, poly(hexamethylene sebacamide), polyaminoundecanoamide, poly(hexamethylene isophthalamide), poly(2-methyl hexamethylene terephthalamide), poly(meta-xylene adipamide), poly(para-xylylene sebacamide), poly(octamethylene oxalamide), and the polyamide from bis(4-aminocyclohexyl) methane and aliphatic acids such as dodecanedioic acid. Copolymers having two or more components, as well as polymer and copolymer mixtures of the above are also included.

In addition to the polyamides, the invention is especially applicable to the crystallizable, linear condensation polyesters. These comprise linear polyesters containing in the polymer carbonyloxy linking radicals,

Polymers containing oxycarbonyloxy radicals are comprehended with this group. The polymers should be of fiber-forming molecular weight; usually, this implies a relative viscosity of about 10 or higher as conventionally measured in solution in a solvent for the polymers. A good solvent for most of the linear condensation polyesters is a mixture of 58.8 parts of phenol and 41.2 parts of trichlorophenol. Copolyesters, terpolyesters, and the like are intended to be comprehended within the term "polyesters."

Examples of crystallizable, linear condensation polyesters include polyethylene terephthalate, polyethylene terephthalate/isophthalate (85/15), polyethylene terephthalate/5 - (sodium sulfo) isophthalate (97/3), poly (p-hexahydroxylylene terephthalate), polyhydroxypivalic acid, poly(decahydronaphthalene-2,6-dimethylene 4,4'-bibenzoate), polyethylene 2,6- or 2,7-naphthalenedicarboxylate, and poly(bicyclohexyl-4,4'-dimethylene-4,4'-bibenzoate), as well as many others. Preferably, the polyester is a linear glycol terephthalate polyester. By this is meant a linear condensation polyester derived from a glycol and an organic acid in which the glycol component is comprised substantially of a dihydroxy compound of a divalent saturated hydrocarbon radical containing from 2 to 10 carbon atoms and the acid component is at least about 75 mole percent terephthalic acid.

*Utility*

The graft copolymers bearing epoxyethylene radicals according to this invention have improved adhesion not only to elastomers such as natural rubber, GRS rubber, polybutadiene, butadiene-styrene and butadiene-acrylonitrile polymers, but also to vinyl plastics, papers, laminating resins, epoxy resins, polyester resins, adhesives, inks and film coating composition and the like. In effect, a permanent "anchor surface" has been grafted to the polymer substrate.

In addition to the foregoing, the grafted products of this invention may be treated with epoxy curing catalysts (such as hexamethylene diamine) or heat alone to provide some cross-linking thereby improving resistance to wrinkling. The products of the invention show improved acid dyeability after the hexamethylene diamine treatment. Improved dye washfastness is also noted for acid and disperse dyes on the grafted fabric which has been partially cross-linked by heat or diamine treatment.

What is claimed is:

1. A shaped structure of a graft copolymer formed from a linear, synthetic condensation polymer selected from the class consisting of (1) a polyamide wherein the recurring amide linkages are an integral part of the polymer chain and (2) a polyester wherein the recurring ester linkages are an integral part of the polymer chain, the shaped structure of the said polymer having side chains bearing epoxyethylene radicals graft polymerized thereto, via carbon to carbon bonds.

2. The structure of claim 1 in the form of a filament.

3. The structure of claim 1 in the form of a film.

4. The structure of claim 1 wherein said side chains are poly(glycidyl methacrylate).

5. The structure of claim 4 wherein said polymer is polyhexamethylene adipamide.

6. The structure of claim 4 wherein said polymer is polyethylene terephthalate.

7. The structure of claim 1 wherein said side chains are poly(glycidyl acrylate).

8. The structure of claim 7 wherein said polymer is polyhexamethylene adipamide.

9. The structure of claim 7 wheerin said polymer is polyethylene terephthalate.

References Cited

UNITED STATES PATENTS 2,798,833  7/1957  Lapensohn _____ 260—830
2,844,552  7/1858  Glaser _____ 260—830

MURRAY TILLMAN, *Primary Examiner.*

P. LIEBERMAN, *Assistant Examiner.*